March 5, 1946.　　B. GROSS ET AL　　2,396,005
SEALING DEVICE
Filed Oct. 2, 1944
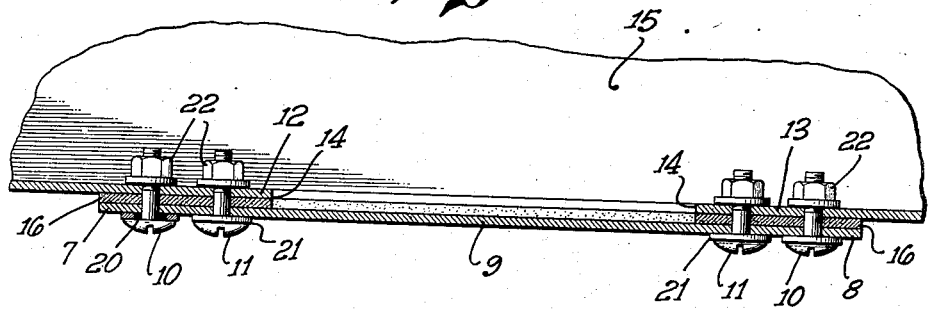
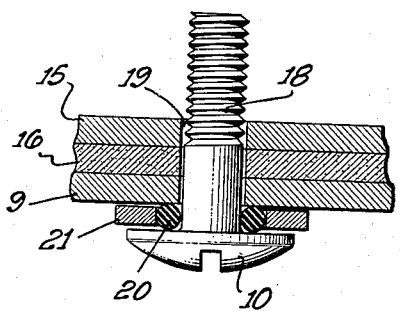 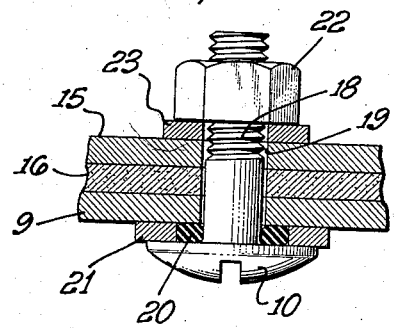
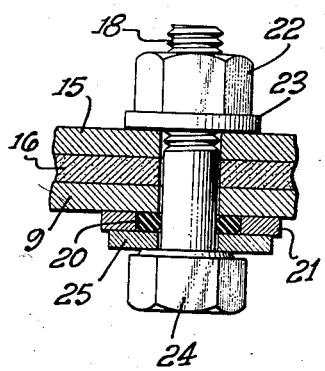 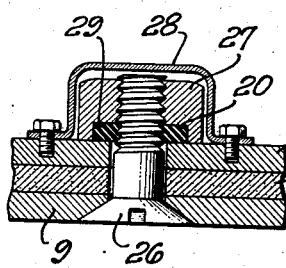 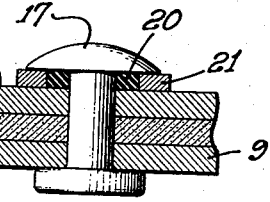
BERNARD GROSS,
LEO W. CORNWALL,
INVENTORS.
BY Everett N. Curtis
ATTORNEY.

Patented Mar. 5, 1946

2,396,005

UNITED STATES PATENT OFFICE 2,396,005

SEALING DEVICE

Bernard Gross and Leo W. Cornwall, San Diego, Calif., assignors to Rohr Aircraft Corporation, Chula Vista, Calif., a corporation of California Application October 2, 1944, Serial No. 556,812

2 Claims. (Cl. 85—1)

Our invention relates to sealing devices, particularly devices employed for sealing bolts and screws or the like as applied to any sort of tank, pressure vessel, fluid container, gas chamber, air cabin or the like, and its objects are to provide a means for the more effective leak proofing of bolts, screws or rivets employed for the juncture of metal parts in said receptacles; to furnish a rapid and simple means for repairing such leaks while the parts are still in service without the necessity for the removal thereof; to make possible permanent mechanical tightness of a door or plate of a tank while at the same time utilizing rubberlike packing under compression; to construct a screw head seal with a washer so as not to weaken the mechanical strength of such head, while at the same time properly distributing the tension leading from said head to the faying surface of the washer; to make provision against corrosion of washers used in connection with said bolts or screws, and, in general, to simplify and render more effective the operation of the several parts. Other objects will appear from the drawing and as hereinafter more particularly set forth and described.

One of the problems in sealing integral wing tanks in airplanes has been the sealing of screws and bolts which secure plates or access doors to the tank. The leaking of screws or bolts can be caused in various ways. When a large plate door is secured by screws or bolts, the screws permit a certain movement of the structure so that eventually fuel will channel around the threads of the screws or bolts and out past the head. The threads of screws or bolts do not always perfectly mate with the threads of the nut and, therefore, leaks occur due to the imperfect fit of the threads. In the case of access doors, the screws or bolts which have imperfect thread fits can puncture an inner sealant, if such a sealant is used and a leak will occur despite the fact that an inner sealant has been used. The constant removal and re-installation of access doors, for the purpose of repairs, causes wear to the threads of the nut plates in the wing and other bolts or screws which have been used. To correct screw or bolt leaks in the past, the screw or bolt has been tightened in some cases to such an extent that the adjoining screws become loose, or the head of the bolt which has been over-tightened will be sheared off in an attempt to stop the leak. When such a bolt breaks, the removal of the shank which remains in the wing structure constitutes a time-consuming repair. Sometimes to repair a leaky screw or bolt, it is partially unscrewed, and a small amount of sealing material put between the inside of the head and its faying surface, after which the bolt is tightened. This method frequently does not afford a permanent remedy because of the fact that the sealing material will be forced out in service leaving a loose metal to metal bearing of the head against its faying surface. An effective method of preventing leaks at screw or bolt locations, and a rapid effective method of permanently stopping leaks at such locations during service is highly desirable because the success of any airplane, particularly cargo and transport types, is dependent on the ability of the airplane to meet schedules. In order to meet schedules, these leaks must not occur too frequently; if they do occur, they must be repaired in a time that will not materially affect the regular flight schedules.

These disadvantages have been overcome through the use of our head seal which is a simple means for sealing the heads of screws, bolts, or rivets, and which, if used in the initial construction of the airplane, will be effective in preventing subsequent leaks. If it is not used in the initial construction of the airplane, it can be used to make a rapid permanent repair on bolts, screws, or rivets which are leaking. Our head seal consists of a metal flat washer, and doughnut shaped rubber-like washer which fits inside of the metal washer. This assembly is placed under the head of the screw, bolt, or rivet prior to installation and the screw or bolt tightened until a firm metal bearing is obtained between the head, the metal washer and its faying surface. During the tightening, the doughnut shaped rubber-like washer assumes the shape of the rectangular channel inside of the metal washer between the head and the surface to which the washer has been attached. The cross section area of the rubber-like washer and the channel inside of the metal washer has been so designed that after the screw, bolt, or rivet has been tightened, the rubber-like material will not only fill the channel, but will represent a rubber-like packing under compression similar to a gland packing. The rubber-like washer is preferably made from a synthetic material which is resistant to fuel.

Attention is hereby directed to the accompanying drawing illustrating preferred forms of our invention in which similar numerals of designation refer to similar parts throughout the several views, and in which:

Figure 1 is a sectional view of the wall and access door of a tank, showing the application of our improved head seals in securing and hermetically sealing said door to said tank, the gaskets between said door and head of the bolt being shown under compression;

Fig. 2 is an enlarged sectional view of the wall of the tank and juncture of the access door shown in Fig. 1, showing the application of our improved seal to a washer head bolt, its nut and adjacent washer being removed, and the doughnut shaped rubber-like washer on said bolt being shown uncompressed;

Fig. 3 is the same view as that of Fig. 2, the nut and its washer being shown in tightened position and the rubber-like washer compressed to seal the head of the bolt;

Fig. 4 is a view similar to that shown in Figs. 2 and 3, but showing the application of our improved seal to a hex head bolt, where a standard metal washer is required between the bolt head and the seal washer;

Fig. 5 is a view showing the application of our seal to a nut where a countersunk screw is used in order to preserve a streamline surface on the outside of the tank, and Fig. 6 is a view showing the application of our seal to a rivet.

Referring to the drawing, the edge portions 7 and 8 of the plate or access door 9 are secured by bolts 10 and 11 to the edge portions 12 and 13 of the wall of the opening or doorway 14 of the tank 15, a rubber-like sealing strip 16 being preferably interposed between said adjacent edge portions of the walls of said door and tank. This sealing strip 16, when used, is normally mounted upon said door and attached thereto by pressure or through the use of some adhesive, conforms and registers with the edge of the doorway 14, and is continuous around said doorway. Said strip could be dispensed with if desired, and metal to metal contact thereby secured, as is almost always the case where a permanent closure is required; the plates forming a finished part of the structure of the tank being preferably so attached. Wherever it is found necessary, however, to open and close the doorway frequently, such strip will be found of advantage in insuring at all times a perfect seal. The bolts 10 and 11 are preferably attached and arranged in two series or lines, each extending continuously around said doorway 14, the bolts of each series being preferably located only a short distance apart and being in staggered relation to the bolts of the other series.

A typical attachment of an access door or plate showing the use of our improved head seals is shown in Figs. 2 and 3, in which the threaded shank 18 of the bolt 10 is shown extending through the opening 19 formed in the wall of access door 9, strip 16 and wall of the tank 15; a thick doughnut shaped washer 20 of rubber-like material closely engaging with said shank and being in close contact with the inner wall of the head of said bolt and outer wall of the plate or door 9, and said washer 20 fitting closely within the metal collar 21 and being thicker and extending appreciably beyond the same. As will be observed from Figs. 2 and 3 of the drawing, the rubber-like washer 20 is of such shape and extent that upon the tightening of the nut 22 over the metallic washer 23, the head of the bolt 10 will be drawn down upon and will compress the body of said washer 20 against the walls with which it is in contact so that the same will effect perfect sealing of said head and adjacent parts against leakage of fluids coming through the opening 19 from the interior of the tank 15. And in the same manner all of bolts 10 and 11 can be tightened and the door 9 hermetically secured over the doorway 14. To remove such door the bolts 10 and 11 can readily be removed as is obvious through the use of a screw driver from the outside of the tank, and the door taken off.

In Fig. 4, we have shown the application of our improved sealing device to a hexagonal headed bolt 24 where an additional standard metal washer 25 is required to be inserted between the head of such bolt and the collar 21 and sealing washer 20. In Fig. 5, we have shown the application of our sealing device where it is found desirable to use a countersunk screw 26 to streamline the outer surface of the tank; in which case the nut 27, engaging with the threaded shank of said screw, is encased against turning and floats within the shell 28, which is located within the tank 15 and secured to the wall thereof, the said nut being provided with a recess 29 within which is received and compressed the rubber-like washer 20 in the same manner and form as hereinbefore set forth. And in Fig. 6, we have shown the application of our seal to a rivet 17, the compression and action of the washer being the same as in the other forms of our invention above described, except as obvious when the rivet is once installed the connection is permanent and cannot be readily replaced.

Our invention is particularly adapted for use in airplane construction, and among other advantages derived from such use is the provision of a simple means of leak proofing screws, bolts or rivets which are used in integral gas tanks in airplanes and also the provision for effecting a repair which will stop leaks in such tanks during the service of such airplanes. Also in connection with airplanes, we have provided a head seal which permits metal to metal bearing or contact, thus making it possible to obtain permanent mechanical tightness of a door or plate in a tank while at the same time bringing about an effective seal through the employment of a rubber-like packing under compression. Also, we have secured a head seal with a washer, which does not weaken the mechanical strength of the head and which properly distributes a tension leading from the screwthread to the faying surface of the washer. Preferably such washer is made from aluminum to act also as a corrosion resistant washer when the bolt or screw is steel and the faying surface of the wing is aluminum.

Our invention may be embodied in other forms or carried out in other ways without departing from the spirit or essential characteristics thereof. The present embodiment of our invention as hereinbefore set forth is therefore to be considered in all respects as illustrative and not restrictive, the scope of our invention being indicated by the appended claims, and all changes which come within the meaning and range of equivalency of the claims are intended to be embraced therein.

Where in the claims we refer to "screwbolts" we desire by the use of such term, except where otherwise limited, to be understood as meaning to include any form of bolt, screw or the like which could be used for the purpose of our invention.

Also by the word "tank" as used in the claims, we desire to be understood as including any sort of tank, pressure vessel, fluid container, gas chamber or the like.

What we claim and desire to secure by Letters Patent is:

1. Means for sealing the walls of a tank secured between the head and shank of a fastener, comprising, in combination, a washer of rigid material having a central bore, surrounding the shank of the fastener and adapted to make rigid contact with the head of the fastener and a tank wall, and a rubber-like doughnut shaped ring positioned within the bore of the washer, said ring having a diameter greater than the thickness of said washer and being confined in said washer with opposite sides thereof normally protruding from the opposite faces of the washer, whereby upon the underside of the head of the fastener compressing the rubber-like ring against a portion of one contiguous wall of the tank being fastened together, said ring is deformed into sealing contact with the bore of the washer, the shank, the head of the fastener, and said contiguous portion of said wall.

2. Means for sealing the walls of a receptacle, comprising, in combination, a fastener having a head and a shank, a standard washer having a central opening snugly fitting the shank of the fastener and having one face disposed adjacent the underside of the head thereof, a sealing washer disposed between the other face of the standard washer and the wall of the receptacle and having a central opening of greater diameter than the shank of the fastener, said standard washer, shank, sealing washer, and a contiguous wall of said receptacle defining an annular sealing chamber and adapted for rigid engagement when the fastening is made secure, and sealing means comprising a rubber-like ring having a body of circular cross section and a greater diameter than the thickness of the sealing washer whereby the body of the ring normally extends beyond opposite faces of the sealing washer before the fastening is made secure, and also whereby when the fastening is made secure by drawing the standard washer into engagement with the sealing washer, said ring is deformed from its initial circular shape into the shape of the said annular chamber to fill and seal the same.

BERNARD GROSS.
LEO W. CORNWALL.